United States Patent
Kim et al.

(10) Patent No.: US 7,140,570 B2
(45) Date of Patent: Nov. 28, 2006

(54) REEL BRAKE DEVICE HAVING SIMPLE STRUCTURE AND A MAGNETIC RECORDING/REPRODUCING APPARATUS HAVING THE SAME

(75) Inventors: Jun-young Kim, Suwon-si (KR); Byeng-bae Park, Ansan-si (KR); Jae-hoon Sim, Suwon-si (KR); Seung-woo Lee, Suwon-si (KR); Hyeong-seok Choi, Suwon-si (KR); Jeong-hyeob Oh, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/141,041

(22) Filed: Jun. 1, 2005

(65) Prior Publication Data

US 2006/0163409 A1    Jul. 27, 2006

(30) Foreign Application Priority Data

Jul. 29, 2004  (KR)  ............... 10-2004-0059546

(51) Int. Cl.
*G03B 1/04* (2006.01)

(52) U.S. Cl. ............... 242/355.1; 242/334.6; 242/421.8; 360/85

(58) Field of Classification Search ............ 242/355, 242/355.1, 334.6, 421.8, 421.9, 422.8; 360/71, 360/85, 93, 95

See application file for complete search history.

(56) References Cited

U.S. PATENT DOCUMENTS

| | | | | |
|---|---|---|---|---|
| 5,114,093 A | * | 5/1992 | Kunimaru et al. | 242/355.1 |
| 5,299,076 A | * | 3/1994 | Park | 360/85 |
| 5,301,897 A | * | 4/1994 | Park | 242/355.1 |
| 5,459,626 A | * | 10/1995 | Lee et al. | 360/85 |
| 5,725,171 A | * | 3/1998 | Ahn | 242/355.1 |
| 5,772,142 A | * | 6/1998 | Ahn | 242/334.6 |
| 5,775,616 A | * | 7/1998 | Sim et al. | 242/334.6 |
| 6,286,775 B1 | * | 9/2001 | Hirabayashi et al. | 242/334.6 |
| 6,405,956 B1 | * | 6/2002 | Takasaka | 242/334.6 |
| 2002/0179761 A1 | * | 12/2002 | Nagasaki et al. | 242/334.6 |
| 2004/0125500 A1 | * | 7/2004 | Kim et al. | 360/85 |
| 2005/0280926 A1 | * | 12/2005 | Seo et al. | 360/85 |

FOREIGN PATENT DOCUMENTS

| | | |
|---|---|---|
| JP | 09-180319 | 7/1997 |
| JP | 10-055585 | 2/1998 |
| JP | 2001-110112 | 4/2001 |

* cited by examiner

*Primary Examiner*—William A. Rivera
(74) *Attorney, Agent, or Firm*—Roylance, Abrams, Berdo & Goodman, L.L.P.

(57) ABSTRACT

Disclosed are a reel brake device and a magnetic recording and reproducing apparatus having the same. The reel brake device comprises a tension band mounted on an outer circumference of a reel disc to control tension, the reel disc which is rotatably mounted on the main chassis to drive a tape reel of a tape cassette, and a brake unit fixed on the main chassis to help the tension band be in contact with the outer circumference of the reel disc. This can replace a conventional brake unit having a complicated structure, and therefore, the number of component parts can be reduced.

7 Claims, 6 Drawing Sheets

REEL BRAKE DEVICE HAVING SIMPLE STRUCTURE AND A MAGNETIC RECORDING/REPRODUCING APPARATUS HAVING THE SAME

CROSS-REFERENCE TO RELATED APPLICATIONS

This application claims benefit under 35 U.S.C. § 119(a) of Korean Patent Application No. 2004-59546, filed Jul. 29, 2004, the entire contents of which are incorporated herein by reference.

BACKGROUND OF THE INVENTION

1. Field of the Invention

The present invention relates to a magnetic recording and reproducing apparatus. More particularly, the present invention relates to a simply-structured reel brake device to brake a reel disc on which a tape cassette is mounted, and a magnetic recording and reproducing apparatus having the same.

2. Description of the Related Art

A general magnetic recording and reproducing apparatus comprising a deck mechanism, such as a video cassette recorder (VCR) or a camcorder, records sound and image information using a recording medium, such as a magnetic tape, moving along a predetermined path, and reproduces the recorded information.

The magnetic recording and reproducing apparatus comprises a main chassis having a rotary head drum, a pair of supply reel discs rotatably mounted to the main chassis to drive a tape reel of a tape cassette, a tension unit for generating predetermined tension while the tape cassette is driving and a brake unit for preventing excessive operation of the supply reel disc. The pair of supply reel discs include a supply reel disc for supplying a tape and a take-up reel disc for rewinding the tape being untied from the supply reel disc. Since the take-up reel disc is not an essential element of the present invention, a detailed description thereof will be ommitted.

FIG. 1 shows a tension unit 10 mounted to a main chassis (not shown), a supply reel disc 30 rotated by the tension unit 10 and a brake unit 50 rotatably mounted to the main chassis (not shown) to selectively brake the supply reel disc 30.

The tension unit 10 comprises a tension arm 12 pivotably mounted on the main chassis, a tension pole 14 formed at one end of the tension arm 12 to withdraw a magnetic tape 22 from a tape cassette and a tension band 16 mounted to the tension arm 12 to enclose an outer periphery of the supply reel disc 30. The supply reel disc 30 has a reel gear 32, at a lower part thereof, rotated by a power transmitted from a capstan motor (not shown).

The brake unit 50 is pivotably mounted on the main chassis to selectively brake the supply reel disc 30. The brake unit 50 comprises a sub brake 52, a main brake 54, a coil spring 56 and a torsion spring 58. The sub brake 52 is pivotably mounted on the main chassis so that one end thereof selectively biases the tension band 16 to the supply reel disc 30. The main brake 54, which is coaxial with the sub brake 52, is pivotably mounted on the main chassis to selectively lock and release the supply reel disc 30. The coil spring 56 elastically pushes the sub brake 52 in contact with the supply reel disc 30. The torsion spring 58 is disposed between the sub brake 52 and the main brake 54 to elastically push the main brake 54 so that the main brake 54 is contacted with the reel gear 32.

A dotted line in FIG. 1 shows the tension unit 10 in a state that a tape cassette is loaded in a magnetic recording and reproducing apparatus. When the tape cassette is loaded, the tension arm 12 rotates about an axis 18 in association with a cam gear (not shown) which is driven by a driving motor (not shown) in a direction illustrated by an arrow. Therefore, the tension pole 14 provided at an end of the tension arm 12 and a pole base unit 20 withdraw the magnetic tape 22 from the tape cassette. The magnetic tape 22 being withdrawn rotates the reel (not shown) of the tape cassette, and the reel of the tape cassette rotates the supply reel disc 30. Due to rotation inertia of the supply reel disc 30, the magnetic tape 22 may be excessively withdrawn even after the tape cassette is loaded. To avoid this, the tension band 16 is provided on the outer periphery of the supply reel disc 30. The sub brake 52 pushes the tension band 16, thereby applying a predetermined friction to the supply reel disc 30. By the friction, the supply reel disc 30 is prevented from being rotated after loading the tape cassette. In addition, the main brake 54 is connected and locked to the reel gear 32 mounted at the lower part of the supply reel disc 30 in order to prevent the tape from being withdrawn continuously by the rotation inertia of the supply reel disc 30 when a play mode is converted to a stop mode.

However, as can be appreciated from the above, the brake unit 50 requires a number of parts and has a complicated structure, thereby increasing manufacturing steps. Accordingly, manufacturing cost and a size of the apparatus are also increased. Therefore, research has been directed to minimizing the size of the apparatus and saving manufacturing costs.

SUMMARY OF THE INVENTION

An aspect of the present invention is to overcome at least the above problems and/or disadvantages and to provide at least the advantages described below. Accordingly, an aspect of the present invention is to provide a simplified reel brake device for improved productivity, a compact size and low manufacturing cost by reducing the number of component parts, and a magnetic recording and reproducing apparatus having the same.

In order to achieve the above-described aspects of the present invention, there is provided a reel brake device comprising a tension band mounted on an outer circumference of a reel disc to provide the reel disc a certain rotational load, the reel disc being rotatably mounted on the main chassis to drive a tape reel of a tape cassette, and a brake unit fixed on the main chassis to help the tension band be in contact with the outer circumference of the reel disc. This brake unit can replace a conventional brake unit which is complicated in structure.

The brake unit comprises a reel cover fixed on the main chassis; and at least one protrusion formed on the reel cover to contact the tension band with the outer circumference of the reel disc. More specifically, two protrusions are provided at opposite ends of the reel cover. Accordingly, the protrusion of the reel cover, together with a conventional reel cover, can replace the conventional brake unit, thereby reducing the number of component parts, improving productivity and saving manufacturing cost. Also, by deleting the conventional brake unit, the whole apparatus takes up less space. In other words, a compact-sized apparatus can be implemented.

The brake unit further comprises an extended jaw formed at the reel cover to cover an upper part of the tension band, thereby preventing the tension band from escaping from the outer circumference of the reel disc.

In order to achieve another aspect of the present invention, there is provided a magnetic recording and reproducing apparatus comprising a main chassis for mounting a head drum that records and reproduces information with respect to a magnetic tape; a tension arm unit pivoting on the main chassis; a reel disc rotatably mounted to the main chassis to drive a tape reel of a tape cassette; and a reel brake device including a tension band fixed on the tension arm unit and a brake unit fixed on the main chassis such that the tension band contacts the outer circumference of the reel disc.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF EXEMPLARY EMBODIMENTS

Figure 1:
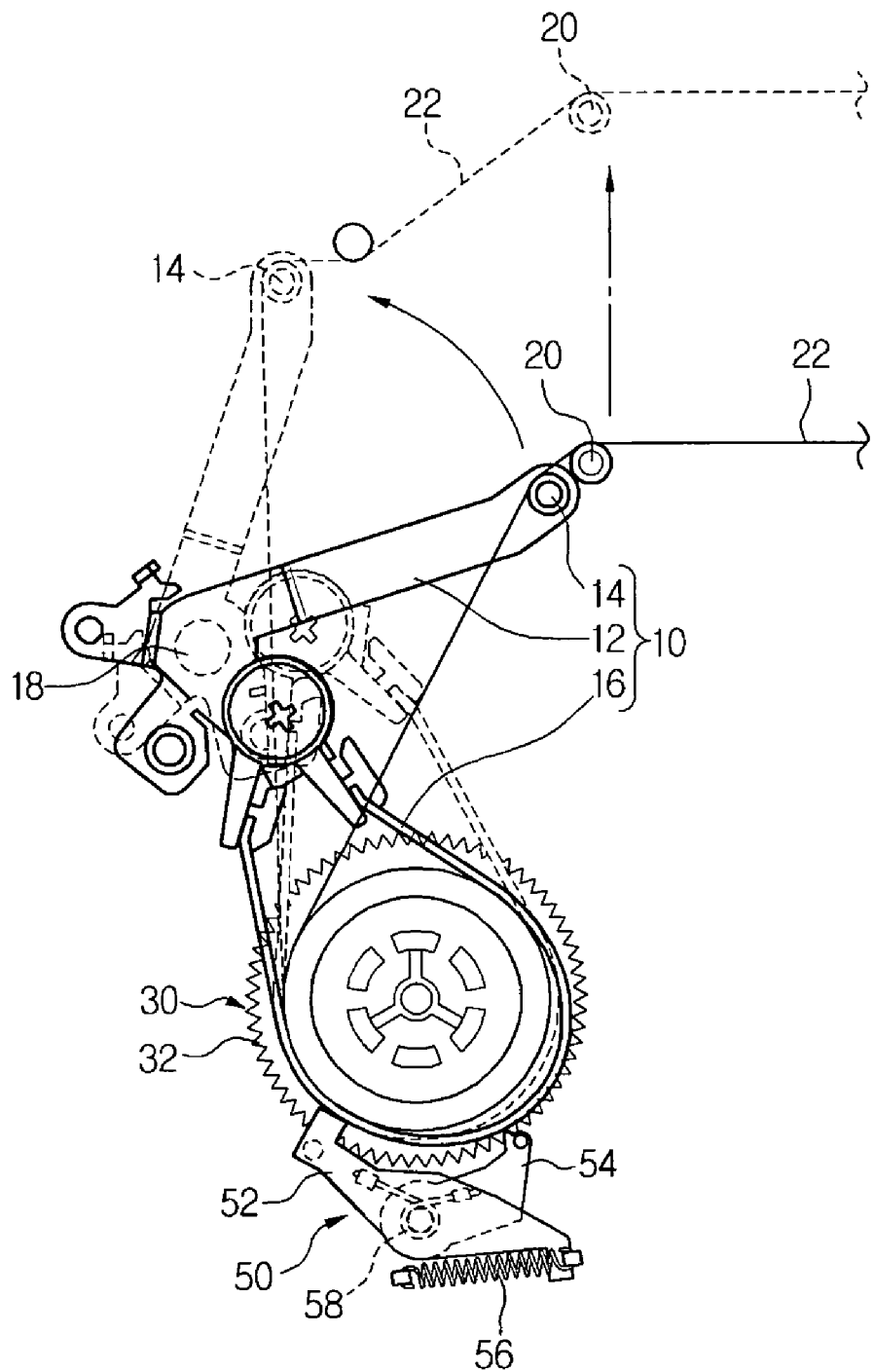
FIG. 1 is a plan view showing the main parts of a conventional magnetic recording and reproducing apparatus.

Hereinafter, an embodiment of the present invention will be described in detail with reference to the accompanying drawing figures.

In the following description, same drawing reference numerals are used for the same elements even in different drawings. The matters defined in the description such as a detailed construction and elements are provided to assist in a comprehensive understanding of the invention. Thus, it is apparent that various changes and modifications to the embodiments described herein can be made without departing from the spirit and scope of the present invention. Also, detailed descriptions of well-known functions or constructions are ommitted to provide a clear and concise description of exemplary embodiments of the present invention.

Figure 2:
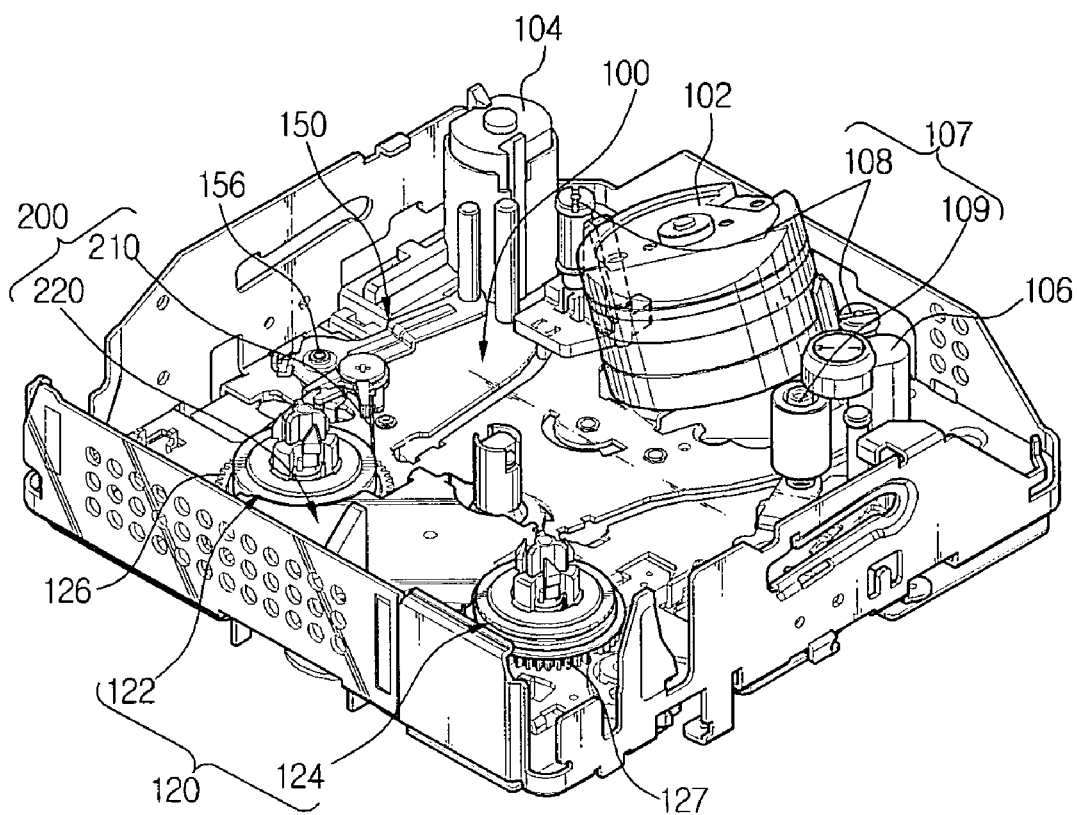
FIG. 2 is a perspective view of a magnetic recording and reproducing apparatus according to an embodiment of the present invention.

Referring to FIG. 2, a magnetic recording and reproducing apparatus according to an embodiment of the present invention comprises a main chassis 100 for mounting a rotary head drum 102 for reading and recording information with respect to a magnetic tape, a pair of reel discs 120 for driving a tape reel of a tape cassette, a reel brake device 200 for restraining rotation of the reel disc 120, and a tension arm unit 150 rotatably mounted to the main chassis 100 to control tension of the magnetic tape.

The main chassis 100 for mounting the rotary head drum 102 comprises a plurality of guide members 107 for guiding the magnetic tape toward the head drum 102. The guide member 107 comprises a pinch roller 109 and a pole base unit 108. The main chassis 100 has a capstan motor 106 for driving the reel disc 120 at the right rear side and a loading motor 104 for transmitting power to other component parts such as the pole base unit 108 that withdraws and guides the magnetic tape at the left rear side.

The reel disc 120 is connected with the tape reel of the tape cassette to drive the tape reel by the power transmitted from the capstan motor 106. The reel disc 120 comprises a supply reel disc 122 mounted at the left of the main chassis 100 to supply the magnetic tape, and a take-up reel disc 124 for rewinding the supplied magnetic tape at the right of the main chassis 100. The supply reel disc 122 and the take-up reel disc 124 are respectively provided with reel gears 126 and 127 to be transmitted with the power from the capstan motor 106. Since the present invention mainly relates to a reel brake device of the supply reel disc 122 while the take-up reel disc 124 is not an essential feature, the supply reel disc 122 will be referred to as just 'reel disc 122' hereinbelow.

The reel brake device 200 always generates friction with the reel disc 122 to prevent a tape from being excessively withdrawn from a tape cassette due to rotation inertia thereof when the tape cassette is loaded or when a play mode stopped. A detailed exemplary structure for the above will be described hereinbelow.

The tension arm unit 150 is pivotably mounted on the main chassis 100 to pivot on an axis 156 in association with a cam gear (not shown) when the loading motor 104 is driven. Additionally, the tension arm unit 150 controls the rotation of the reel disc 120 for the magnetic tape to maintain constant tension in the play mode.

Figure 3:
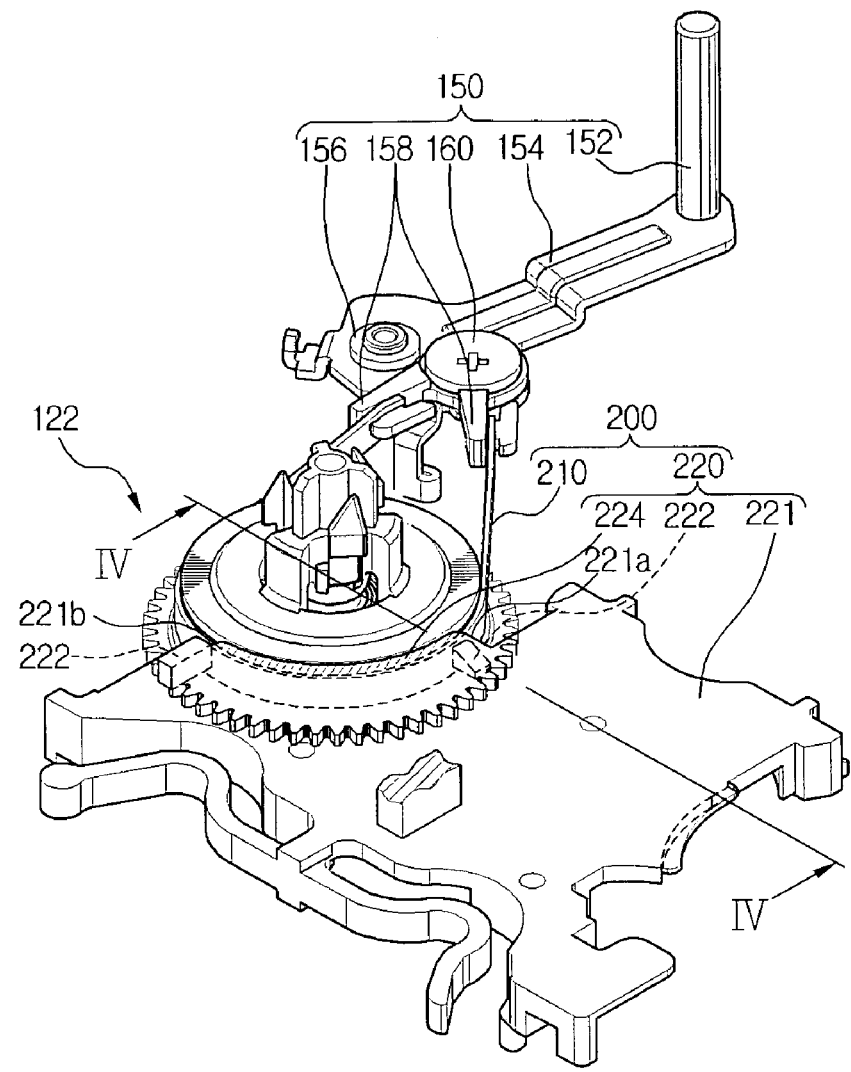
FIG. 3 is a perspective view showing the main parts of FIG. 2.
Figure 4:
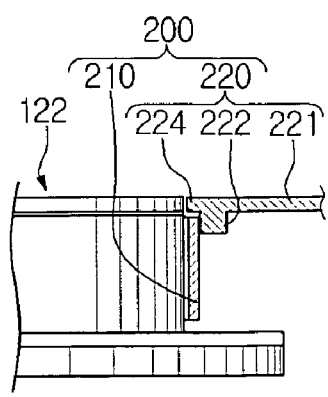
FIG. 4 is a sectional view of FIG. 3 cut along a line IV—IV.

FIG. 3 is a perspective view showing main parts of FIG. 2, and FIG. 4 is a sectional view of FIG. 3 cut along a line IV—IV.

Referring to FIGS. 3 and 4, the tension arm unit 150 comprises a tension arm 154, a tension pole 152 protruded upward on an end of the tension arm 154, a tension band connection part 158 formed on the other end of the tension arm 154 to mount a tension band 210, and a tension control part 160 for rotating the tension band connection part 158 to control the tension applied to the reel disc 122 by the tension band 210. When the tape cassette is loaded, the tension arm unit 150 pivots on the axis 156 in association with the cam gear (not shown) which is driven by the loading motor 104 (FIG. 2). Here, the tension pole 152 withdraws the magnetic tape from the tape cassette. During the play mode, the tension arm 154 pivoting in one direction is elastically biased by an elastic member (not shown), such that the tension of the tension band 210 toward the reel disc 122 can be controlled according to pressure of the magnetic tape toward the tension pole 152. Accordingly, the tension arm unit 150 maintains regular tension of the magnetic tape.

The reel brake device 200 comprises the tension band 210 connected to the tension band connection part 158 by both ends thereof, and a brake unit 220 fixed to the main chassis 100 (FIG. 2) so that the tension band 210 contacts with an outer circumference of the reel disc 122. The brake unit 220 comprises a reel cover 221 fixed to the main chassis 100, two protrusions 222 formed at the reel cover 221 to help at least a part of the tension band 210 be biased and contacted with the outer circumference of the reel disc 122, and an extended jaw 224 formed on the reel cover 221 and extended from the protrusions 222 toward the reel disc 122. The protrusions 222 are provided at opposite ends 221a and 221b of the reel cover 221 and distanced from each other. Accordingly, the two projections 221a and 221b push the tension band 210 toward the reel disc 122 for more even friction distribution. According to an embodiment of the present invention, the protrusion 222 is integrally formed with the reel cover 221, however, the protrusion 222 may be implemented by other various methods, such as, by attaching a separate member to the reel cover 221 using an adhesive. Further, the extended jaw 224 covers an upper part of the tension band 210 from one end 221a and the other end 221b of the reel cover 221, as shown in FIG. 3. Accordingly, the tension band 210 is prevented from escaping from the reel disc 122.

Figure 5A:
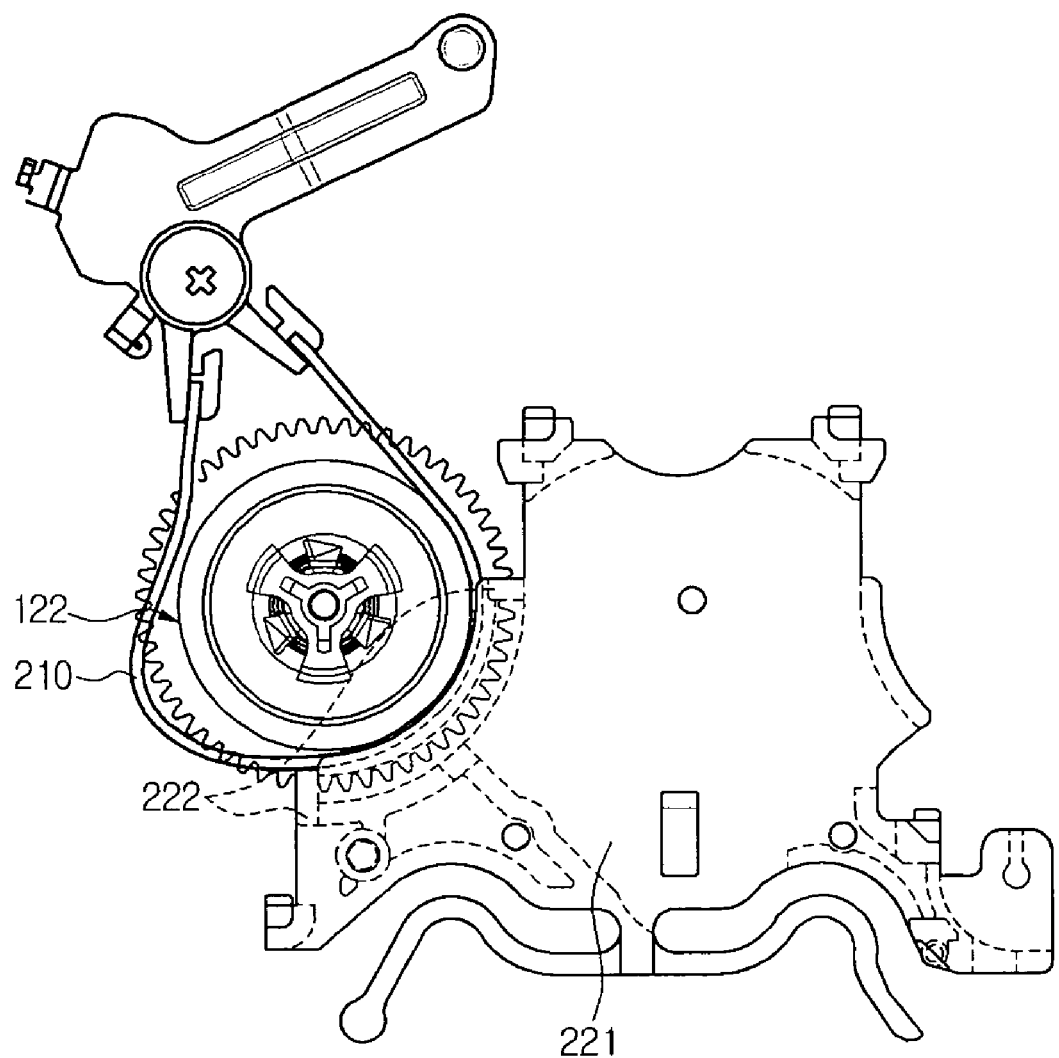
FIGS. 5A to 5C are plan views for explaining the operation of a reel brake device according to an embodiment of the present invention.
Figure 5B:
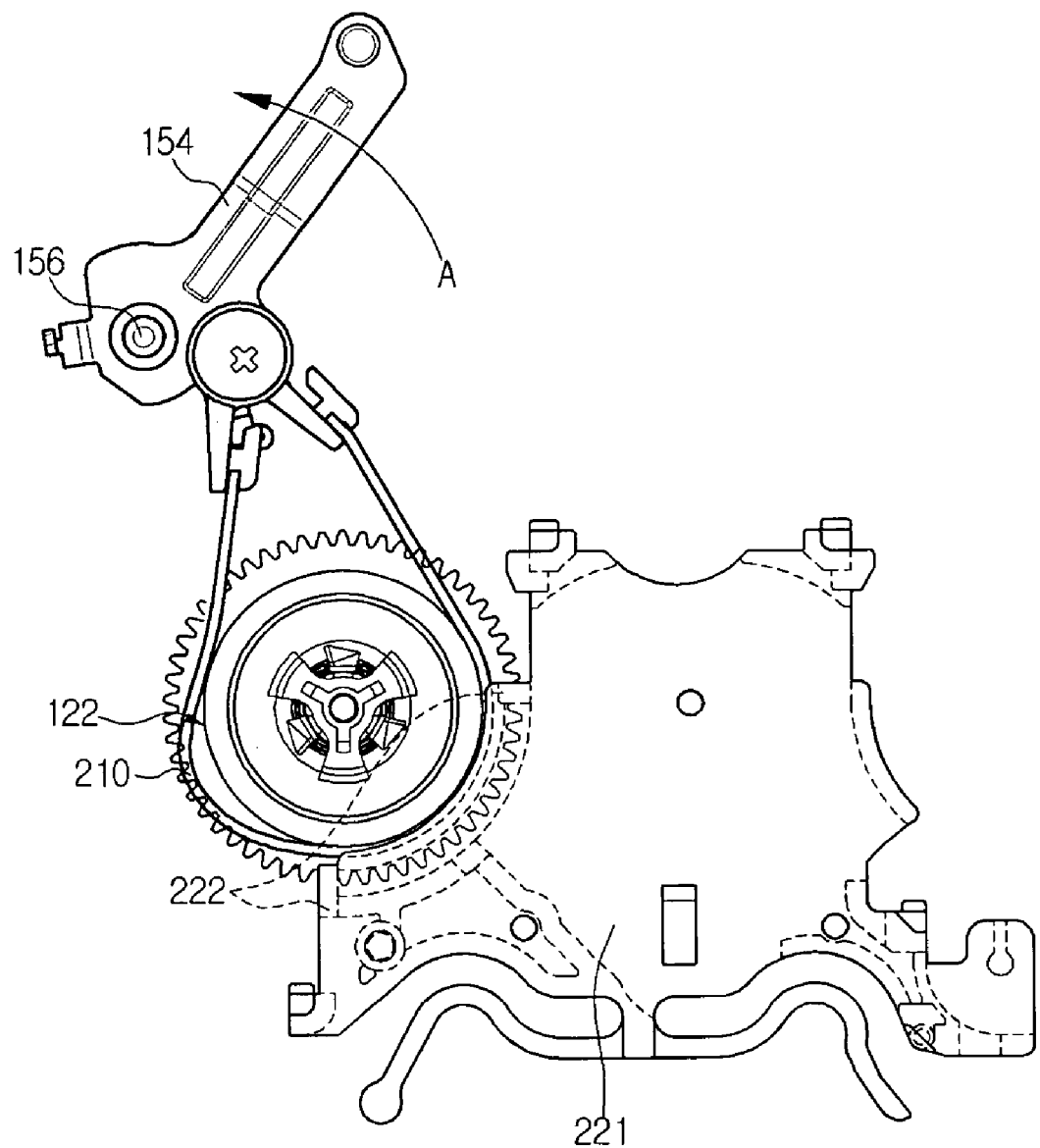
Figure 5C:
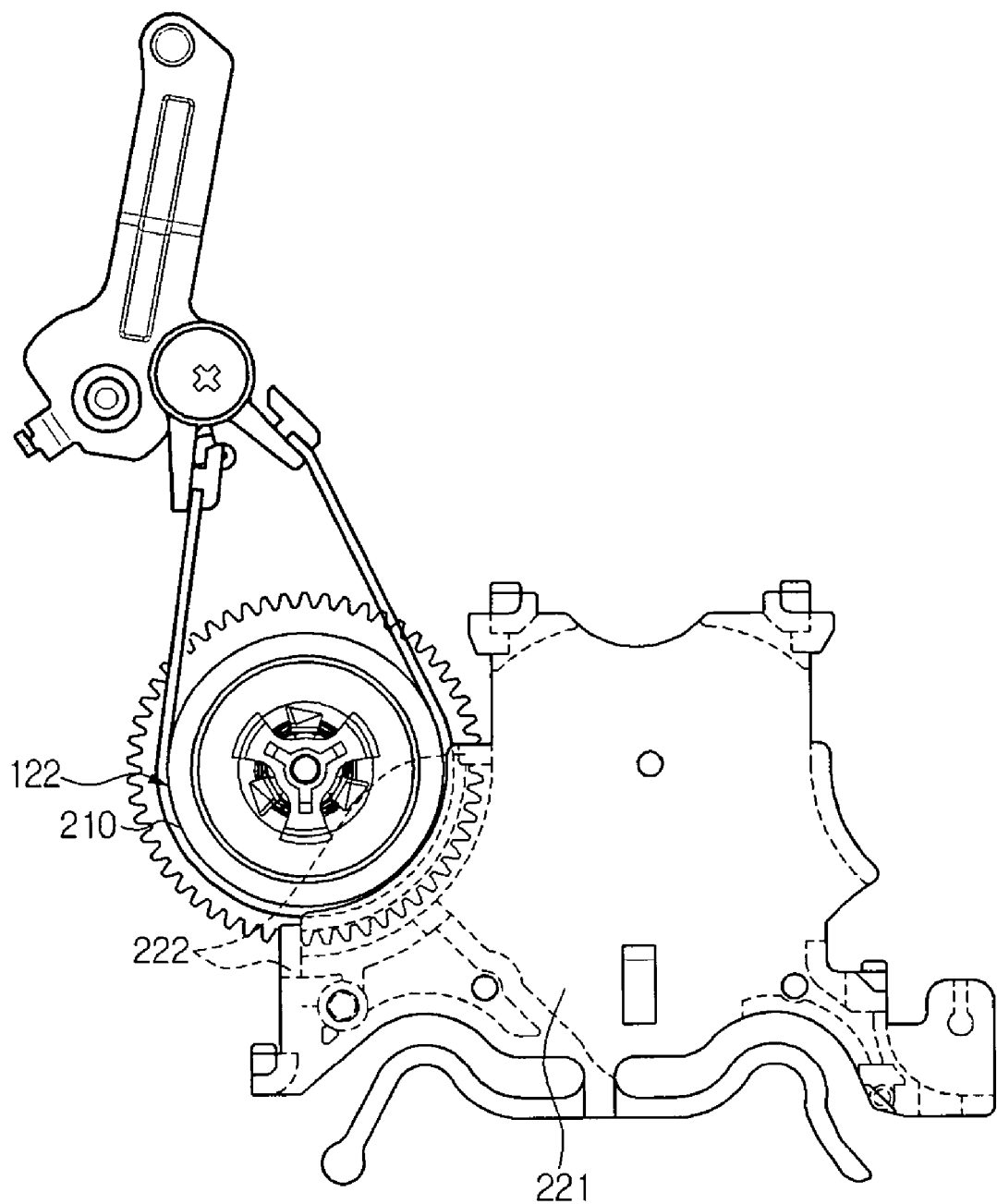

FIGS. 5A to 5C are drawings for explaining the operation of the reel brake device 200.

FIG. 5A shows a state before the magnetic tape is loaded. Referring to FIG. 5A, the tension band 210 enclosing the outer circumference of the reel disc 122 is drooped in one direction, however, a part of the outer circumference of the reel disc 122 is in contact with the tension band 210 because the protrusion 222 formed on the reel cover 221 pushes the tension band 210. Moreover, since the extended jaw 224 formed on the reel cover 122 restricts the upper part of the tension band 210, the tension band 210 does not escape from the reel disc 122.

FIG. 5B shows process of loading the magnetic tape.

Referring to FIG. 5B, the cam gear (not shown) which is driven by the loading motor 104 (FIG. 2) drives the tension arm 154, and therefore the tension arm 154 pivots on the axis 156 in an 'A' direction. Accordingly, the tension band 210 mounted at one end of the tension arm 154 is gradually taken up, thereby contacting with the outer circumference of the reel disc 122 by a wider area. As the magnetic tape is withdrawn from the tape cassette, a reel (not shown) of the tape cassette is rotated, thereby rotating the reel disc 122. Due to rotation inertia, the reel disc 122 would keep rotating even after the magnetic tape is loaded. Therefore, the magnetic tape may be excessively withdrawn by the rotation inertia of the reel disc 122. However, according to an embodiment of the present invention, due to the protrusion 222 pushing the tension band 210 toward the reel disc 122, the reel disc 122 is applied with predetermined friction by the tension band 210. The friction can prevent an idle rotation of the reel disc 122 after loading the magnetic tape.

FIG. 5C shows the reel brake device 200 in the play mode after the magnetic tape is loaded.

Referring to FIG. 5C, even while the magnetic tape is being played, the protrusion 222 pushes the tension band 210 toward the reel disc 122. Therefore, the reel disc 122 is applied with predetermined friction while rotating. When the play mode is converted to the stop mode, the reel disc 122 is likely to keep its rotation due to the rotation inertia. However, the friction of the tension band 210 being biased by the protrusion 222 can prevent the reel disc 122 from idly rotating, and therefore, the a main brake in a conventional reel brake device, which is for stopping the rotation of the reel disc 122, can be deleted. In addition, a conventional sub brake for pressingly contact the tension band 210 with the reel disc 122 can also be deleted since the protrusion 222 of this embodiment maintains the contact between the tension band 210 and the reel disc 122. Thus, as the conventional main brake and sub brake become dispensable, the number of parts can be reduced and the assembly process is improved. Moreover, economy in the manufacturing cost and compactness in the size can also be achieved.

While the invention has been shown and described with reference to certain embodiments thereof, it will be understood by those skilled in the art that various changes in form and details may be made therein without departing from the spirit and scope of the invention as defined by the appended claims.

What is claimed is:

1. A reel brake device comprising:
   a tension band mounted on an outer circumference of a reel disc to provide the reel disc a certain rotational load, the reel disc being rotatably mounted on the main chassis to drive a tape reel of a tape cassette;
   a brake unit fixed on the main chassis contacting the tension band on an outer circumference of the reel disc;
   a reel cover fixed on the main chassis; and
   at least one protrusion formed on the reel cover to contact the tension band with the outer circumference of the reel disc.

2. The reel brake device of claim 1, wherein the brake unit comprises an extended jaw at the reel cover to prevent the tension band from being escaped from the outer circumference of the reel disc.

3. The reel brake device of claim 2, wherein the at least one protrusion and the extended jaw are integrally formed with the reel disc.

4. The reel brake device of claim 3, wherein two protrusions are provided at the opposite ends of the reel cover.

5. A magnetic recording and reproducing apparatus comprising:
   a main chassis for mounting a head drum that records and reproduces information with respect to a magnetic tape;
   a tension arm unit pivoting on the main chassis;
   a reel disc rotatably mounted to the main chassis to drive a tape reel of a tape cassette;
   a reel brake device including a tension band fixed on the tension arm unit and a brake unit fixed on the main chassis contacting the tension band on an outer circumference of the reel disc;
   a reel cover fixed on the main chassis; and
   at least one protrusion formed on the reel cover to contact the tension band with the outer circumference of the reel disc.

6. The A magnetic recording and reproducing apparatus of claim 5, wherein the brake unit comprises:
   an extended jaw at the reel cover to prevent the tension band from being escaped from the outer circumference of the reel disc.

7. The magnetic recording and reproducing apparatus of claim 6, wherein the at least one protrusion and the extended jaw are integrally formed with the reel disc.

\* \* \* \* \*